United States Patent
Muldoon

(10) Patent No.: US 11,719,113 B2
(45) Date of Patent: Aug. 8, 2023

(54) COOLING SYSTEM FOR POWER CABLES IN A GAS TURBINE ENGINE

(71) Applicant: UNITED TECHNOLOGIES CORPORATION, Farmington, CT (US)

(72) Inventor: Marc J. Muldoon, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 26 days.

(21) Appl. No.: 16/782,650

(22) Filed: Feb. 5, 2020

(65) Prior Publication Data
US 2021/0239046 A1    Aug. 5, 2021

(51) Int. Cl.
| | | |
|---|---|---|
| *F01D 9/06* | (2006.01) | |
| *F02C 7/18* | (2006.01) | |
| *F01D 25/12* | (2006.01) | |
| *F04D 25/06* | (2006.01) | |
| *F01D 15/10* | (2006.01) | |

(52) U.S. Cl.
CPC .............. *F01D 9/065* (2013.01); *F01D 25/12* (2013.01); *F02C 7/18* (2013.01); *F01D 15/10* (2013.01); *F04D 25/06* (2013.01)

(58) Field of Classification Search
CPC .... F02C 7/18; F02C 7/12; F01D 9/065; F01D 15/10; F01D 25/12; F04D 25/06; B64D 2027/026; B64D 27/12
See application file for complete search history.

(56) References Cited

U.S. PATENT DOCUMENTS

| | | | |
|---|---|---|---|
| 4,055,041 A * | 10/1977 | Adamson | ............... F01D 11/08 415/196 |
| 5,154,052 A | 10/1992 | Giffin, III | |
| 5,435,127 A | 7/1995 | Luffy et al. | |
| 6,895,756 B2 | 5/2005 | Schmotolocha | |
| 6,931,856 B2 | 8/2005 | Belokon et al. | |
| 7,134,271 B2 | 11/2006 | Baughman | |
| 7,383,685 B2 | 6/2008 | Means | |
| 8,487,500 B2 | 7/2013 | Cullen et al. | |
| 9,003,811 B2 | 4/2015 | Barnett et al. | |

(Continued)

FOREIGN PATENT DOCUMENTS

| | | |
|---|---|---|
| EP | 2708701 | 3/2014 |
| EP | 3553295 | 10/2019 |

(Continued)

OTHER PUBLICATIONS

European Patent Office, European Search Report dated Jun. 4, 2021 in Application No. 21154864.9.

(Continued)

*Primary Examiner* — Katheryn A Malatek
*Assistant Examiner* — Alyson Joan Harrington
(74) *Attorney, Agent, or Firm* — Snell & Wilmer L.L.P.

(57) ABSTRACT

A cooling system for a plurality of conductive cables in a gas turbine engine includes a cooling source and an electric motor disposed in a tail cone. The cooling source may comprise an electric fan or an oil pump. The cooling source may be configured for active cooling of the plurality of conductive cables. The electric fan may be in fluid communication with ambient air during operation of the gas turbine engine.

9 Claims, 5 Drawing Sheets

(56) References Cited

U.S. PATENT DOCUMENTS

| | | | |
|---|---|---|---|
| 9,097,134 | B2 | 8/2015 | Ferch et al. |
| 9,148,040 | B2 | 9/2015 | Anthony |
| 9,239,029 | B2 | 1/2016 | Herrmann |
| 9,644,538 | B2 | 5/2017 | Dionne |
| 9,879,600 | B2 | 1/2018 | Stovall |
| 9,917,490 | B2 | 3/2018 | Lemmers et al. |
| 9,958,160 | B2 | 5/2018 | Dierberger |
| 10,308,366 | B2 | 6/2019 | Kupiszewski et al. |
| 10,422,282 | B2 | 9/2019 | Williams |
| 11,047,306 | B1 | 6/2021 | Millhaem |
| 2005/0091963 | A1 | 5/2005 | Li |
| 2013/0284420 | A1* | 10/2013 | Stovall ............... F02C 7/12 165/287 |
| 2014/0252769 | A1 | 9/2014 | Menheere et al. |
| 2014/0321981 | A1 | 10/2014 | Rodriguez et al. |
| 2016/0149469 | A1 | 5/2016 | Lemmers et al. |
| 2016/0258358 | A1 | 9/2016 | Kazlauskas et al. |
| 2017/0184025 | A1 | 6/2017 | Swayers-Abbott |
| 2018/0050806 | A1 | 2/2018 | Kupiszewski et al. |
| 2018/0051701 | A1 | 2/2018 | Kupiszewski et al. |
| 2018/0051702 | A1 | 2/2018 | Kupiszewski et al. |
| 2018/0051716 | A1 | 2/2018 | Cheung et al. |
| 2018/0283197 | A1* | 10/2018 | Jackowski ............ F01D 25/14 |
| 2019/0085715 | A1 | 3/2019 | van der Merwe |
| 2021/0018008 | A1 | 1/2021 | Muldoon |
| 2021/0108568 | A1 | 4/2021 | Caimano |
| 2021/0324799 | A1* | 10/2021 | Suzuki ................. F02C 6/08 |
| 2022/0045573 | A1* | 2/2022 | Seki .................... F02C 7/00 |

FOREIGN PATENT DOCUMENTS

| | | |
|---|---|---|
| GB | 865838 | 4/1961 |
| JP | 2001078344 | 3/2001 |
| JP | 2004076703 | 3/2004 |
| WO | 2021014667 | 1/2021 |

OTHER PUBLICATIONS

United Kingdom Intellectual Property Office, United Kingdom Preliminary Report dated Sep. 1, 2021 in Application No. GB2112187.6.

USPTO, Non-Final Office Action dated Oct. 18, 2021 in U.S. Appl. No. 16/511,135.

USPTO, Restriction/Election Requirement dated Jan. 18, 2022 in U.S. Appl. No. 17/018,795.

United Kingdom Intellectual Property Office, United Kingdom Search Report dated Dec. 23, 2021 in Application No. GB2112187.6.

European Patent Office, European Partial Search Report dated Mar. 2, 2021 in Application No. 20184955.1.

USPTO; Non-Final Office Action dated Jun. 17, 2022 in U.S. Appl. No. 17/081,627.

USPTO, Non-Final Office Action dated May 10, 2022 in U.S. Appl. No. 17/018,795.

European Patent Office; Extended European Search Report dated Apr. 28, 2022 in Application No. 21184728.0.

USPTO, Advisory Action dated Jun. 3, 2022 in U.S. Appl. No. 16/511,135.

European Patent Office, European Office Action dated Jan. 4, 2022 in Application No. 21184728.0.

USPTO, Final Office Action dated Mar. 18, 2022 in U.S. Appl. No. 16/511,135.

USPTO, Notice of Allawence dated Nov. 3, 2022 in U.S. Appl. No. 17/018,795.

USPTO, Notice of Allawence dated Nov. 4, 2022 in U.S. Appl. No. 17/081,627.

European Patent Office, European Office Action dated Mar. 6, 2023 in Application No. 20184955.1.

\* cited by examiner

COOLING SYSTEM FOR POWER CABLES IN A GAS TURBINE ENGINE

FIELD

The present disclosure relates to gas turbine engines, and, more specifically, to cooling systems for conductive cables in gas turbine engines.

BACKGROUND

A turbofan engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Electric power for the engine is typically provided by a motor/generator driven through a tower shaft driven by a main engine shaft. Motor/generators and electric motors are typically stand-alone devices that are coupled to an external accessory gearbox. Alternate motor/generator and motor configurations and placements may provide increased engine efficiencies and accommodate increasing demands for electric power.

SUMMARY

A cooling system for a gas turbine engine is disclosed herein. The cooling system may comprise: an electric motor; a conduit; a plurality of conductive cables extending from the electric motor, the plurality of conductive cables disposed at least partially in the conduit; and a cooling source in fluid communication with the conduit, the cooling source configured to flow a fluid through the conduit to cool the plurality of conductive cables after shutdown of the gas turbine engine.

In various embodiments, the cooling source comprises an electric fan. The electric fan may be configured to actively cool the plurality of conductive cables. The cooling system may further comprise an external air source in fluid communication with the electric fan. The external air source may be disposed radially outward from a bypass airflow path of the gas turbine engine. The cooling system may further comprise a pylon and a strut, wherein the strut extends from a tail cone to the pylon, wherein the electric motor is disposed in the tail cone, and wherein the conduit extends through the strut. The cooling source may include an oil pump. The cooling system may further comprise a heat exchanger, wherein the oil pump is configured to pump oil through the heat exchanger and through the conduit to cool the plurality of conductive cables. An oil circuit having the oil pump and the heat exchanger may be secondary to a gas turbine engine oil circuit.

A method of cooling a plurality of conductive cables in an exhaust section of a gas turbine engine is disclosed herein. The method may comprise: flowing air from an external air source of the gas turbine engine, the external air source being exposed to air radially outward from a bypass airflow during operation of the gas turbine engine; and flowing air through a conduit having the plurality of conductive cables disposed therein, the plurality of conductive cables coupled to an electric machine disposed in a tail cone of the gas turbine engine.

In various embodiments, the method may further comprise releasing air through an egress of the tail cone. The method may further comprise shutting down the gas turbine engine prior to flowing air from the external air source. The external air source may be disposed radially outward from a bypass flow path of the gas turbine engine. The flowing air through the conduit may include actively cooling the plurality of conductive cables. The external air source may include a vent or a scoop.

A cooling system of a gas turbine engine is disclosed herein, the cooling system may comprise: a processor; and a non-transitory computer readable storage medium in electronic communication with the processor, the non-transitory computer readable storage medium having instructions stored thereon that, in response to execution by the processor cause the processor to perform operations comprising: detecting, by the processor, a shutdown of the gas turbine engine; activating, by the processor, a cooling source configured to flow a fluid through a conduit having a plurality of conductive cables disposed therein.

In various embodiments, the cooling source may include an electric fan, wherein activating further comprises increasing a speed of the electric fan. The cooling source may include an electric fan, wherein the operations further comprise opening, by the processor, a vent in fluid communication with an external air source. The cooling system may further comprise a conduit, wherein the cooling source includes an electric fan, wherein the plurality of conductive cables are disposed at least partially in the conduit, and wherein the conduit is in fluid communication with the electric fan. The cooling source may include an electric oil pump.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity. Surface shading lines and/or cross-hatching may be used throughout the figures to denote different parts but not necessarily to denote the same or different materials.

Aft includes the direction associated with the tail (e.g., the back end) of an aircraft, or generally, to the direction of exhaust of a gas turbine engine. Forward includes the direction associated with the intake (e.g., the front end) of a gas turbine engine.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to references other than the engine central longitudinal axis.

Figure 1A:
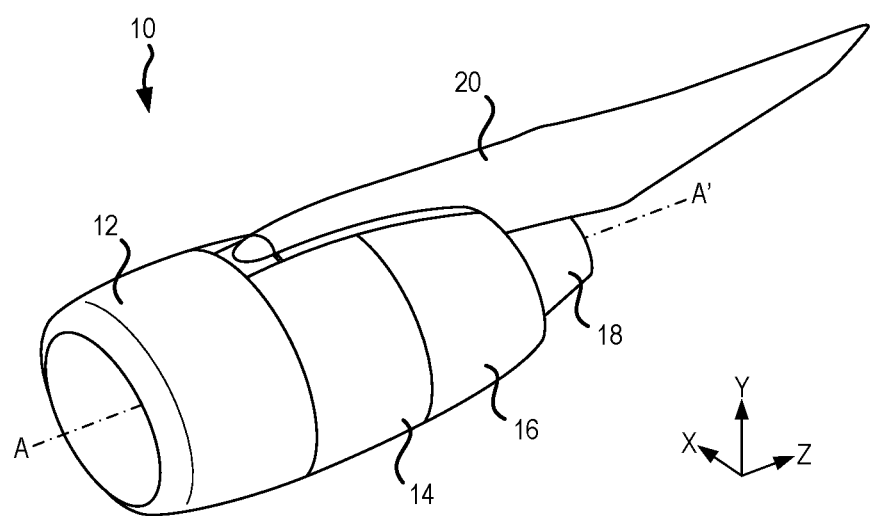
FIG. 1A illustrates a nacelle for a gas turbine engine, in accordance with various embodiments.

With reference to FIG. 1A, a nacelle 10 for a gas turbine engine is illustrated according to various embodiments. Nacelle 10 may comprise an inlet 12, a fan cowl 14, and a thrust reverser 16. Nacelle 10 may be coupled to a pylon 20. Pylon 20 may mount nacelle 10, and a gas turbine engine located within nacelle 10, to an aircraft wing or aircraft body. In various embodiments, an exhaust system 18 may extend from the gas turbine engine mounted within nacelle 10.

Figure 1B:
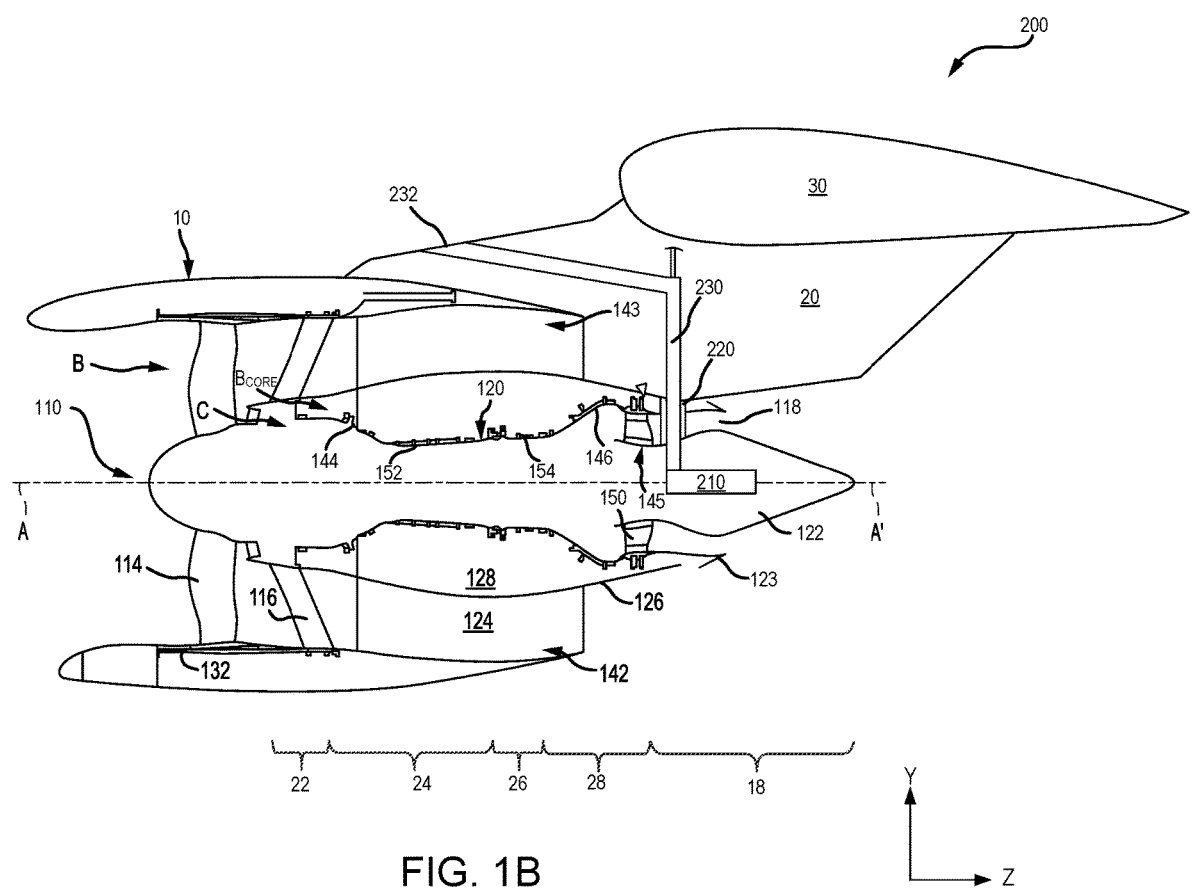
FIG. 1B illustrates a cross-sectional view of a gas turbine engine having a fluid injection system, in accordance with various embodiments.

FIG. 1B illustrates a cross-sectional view of a gas turbine engine 110 located within nacelle 10, in accordance with various embodiments. Gas turbine engine 110 may include a core engine 120. Core engine 120 may include an inlet section 22, a compressor section 24, a combustor section 26, and a turbine section 28. In operation, a fan 114 drives fluid (e.g., air) along a bypass flow-path B while compressor section 24 can drive air along a core flow-path C for compression and communication into combustor section 26 then expansion through turbine section 28. In various embodiments, core engine 120 generally comprises a low speed spool and a high speed spool mounted for rotation about an engine central longitudinal axis A-A'. Low speed spool may generally comprise a shaft that interconnects fan 114, a low pressure compressor 144, and a low pressure turbine 146. The high speed spool may comprise a shaft that interconnects a high pressure compressor 152 and high pressure turbine 154. A combustor may be located between high pressure compressor 152 and high pressure turbine 154. As used herein, a "high pressure" compressor or turbine experiences a higher pressure than a corresponding "low pressure" compressor or turbine. Although depicted as a turbofan engine 110 herein, it should be understood that the concepts described herein are not limited in use to turbofans as the teachings may be applied to other types of engines including turboprop and turboshaft engines. Although core engine 120 may be depicted as a two-spool architecture herein, it should be understood that the concepts described herein are not limited in use to two-spool gas turbine engines as the teachings may be applied to other types of engines including engines having more than or less than two spools.

Core engine 120 drives fan 114 of gas turbine engine 110. The airflow in core flow path C may be compressed by low pressure compressor 144 then high pressure compressor 152, mixed and burned with fuel in the combustor section 26, then expanded through high pressure turbine 154 and low pressure turbine 146. Turbines 146, 154 rotationally drive their respective low speed spool and high speed spool in response to the expansion. Bypass airflow B, driven by fan 114, flows in the aft direction through bypass flow path 124. At least a portion of bypass flow path 124 may be defined by nacelle 10 and an inner fixed structure (IFS) 126.

An upper bifurcation 143 and a lower bifurcation 142 may extend radially between the nacelle 10 and IFS 126 in locations opposite one another. Engine components such as wires and fluids, for example, may be accommodated in upper bifurcation 143 and lower bifurcation 142. IFS 126 surrounds core engine 120 and provides core compartment 128. Various components may be provided in core compartment 128 such as fluid conduits and/or compressed air ducts. For example, a portion $B_{CORE}$ of bypass airflow B may flow between core engine 120 and IFS 126 in core compartment 128. A fan case 132 may surround fan 114. Fan case 132 may be housed within nacelle 10. Fan case 132 may provide a mounting structure for securing gas turbine engine 110 to pylon 20, with momentary reference to FIG. 1A. According to various embodiments, one or more fan exit guide vanes 116 may extend radially between core engine 120 and fan case 132.

Exhaust system 18 is located aft of turbine section 28. Core airflow C flows through core engine 120 and is expelled through an exhaust outlet 118 of exhaust system 18. Exhaust outlet 118 may comprise an aerodynamic tail cone 122. A primary nozzle 123 may be located radially outward of tail cone 122. Primary nozzle 123 and tail cone 122 may define exhaust outlet 118. Exhaust outlet 118 provides an exhaust path for core airflow C exiting turbine section 28 of core engine 120. A secondary nozzle may be located radially outward of primary nozzle 123. Primary nozzle 123 and the secondary nozzle may define an exit flow path for bypass airflow B exiting core compartment 128 and/or bypass flow path 124. A plurality of turbine exit guide vanes (TEGVs) 150 may be located circumferentially about engine central longitudinal axis A-A' and proximate an aft end 145 of low pressure turbine 146.

In various embodiments, an electric motor 210 is disposed in tail cone 122. The electric motor 210 may be mechanically coupled to a low speed spool in core engine 120. Electric motor 210 may comprise an electric generator, an electric motor, a combination of the two, or the like. Electric motor 210 may be electrically coupled to a juncture box, or any other electrical device known in the art. The electrical device may be disposed radially outward from IFS 126 of gas turbine engine 110 in a wing 30 of an aircraft the pylon 20 of the aircraft, or the like. Conductive cables may extend from the electric motor 210 to the electric device external to gas turbine engine 110. The conductive cables (e.g., copper wires or the like) may extend radially outward from electric motor 210 through a strut 220, through the pylon 20 and to an electrical device in the wing 20, or any other location external to IFS 126. The strut 220 extends from the tail cone 122 to the IFS 126. The strut may be disposed aft of the aft end 145 of low pressure compressor turbine 146 and forward of exhaust outlet 118. Due to the conductive cables proximity to exhaust outlet 118, the conductive cables may experience relatively high temperatures from airflow in core airflow path C.

In various embodiments, the conductive cables may be disposed in a conduit 230 extending radially outward from tail cone 122 through strut 220 and into the pylon 20. The conduit 230 may be fluidly coupled to an external air source by any method known in the art, such as a scoop, a vent, or the like. The external air source 232 may be disposed radially outward from nacelle 10. In this regard, the external air source 232 may receive colder temperature air relative to bypass airflow B.

In various embodiments, bleed air from the core airflow path C may be diverted aft of the fan as a cooling source. However, bleed air may increase the mass flow and/or reduce efficiency of gas turbine engine 110. To address this, ambient air may be pulled from external to gas turbine engine 110, which may reduce or eliminate utilizing bleed air for the cooling of conductive power cables. In various embodiments, bypass air from bypass airflow path B may be diverted to act as a cooling source for cooling of conductive cables. However, bypass air may be limited to use while the gas turbine engine 110 is in operation. In this regard, bypass air may provide insufficient cooling after engine shutdown, or the like.

Figure 2:
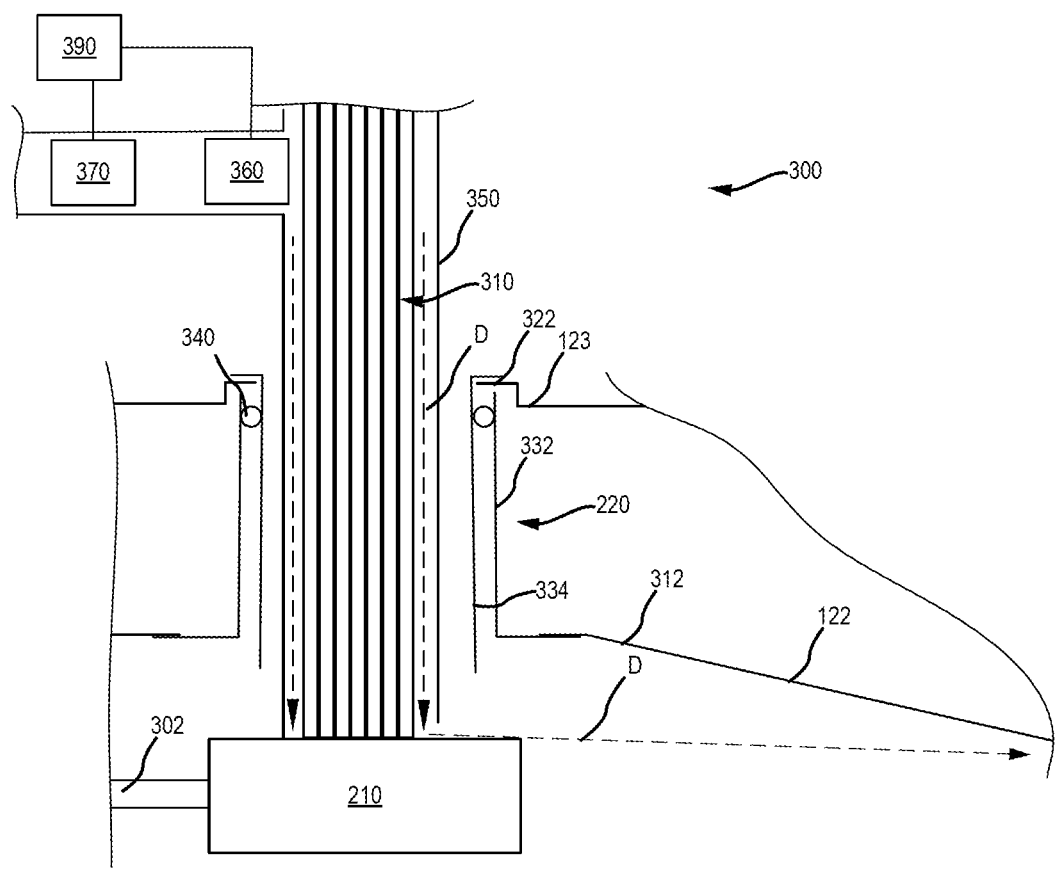
FIG. 2 illustrates a schematic view of cooling system of a gas turbine engine, in accordance with various embodiments.

Referring now to FIG. 2, a schematic view of a conductive cable cooling system 300, in accordance with various embodiments, is illustrated. The conductive cable cooling system 300 comprises a plurality of conductive cables 310. The conductive cables 310 are extending from an electric motor 210 disposed in a tail cone 122. The electric motor 210 is operably coupled to a low speed spool 302 of a gas turbine engine (e.g., gas turbine engine 110 from FIG. 1B). The conductive cable cooling system 300 further comprises a strut 220 extending from a radially outer surface 312 of tail cone 122 to a radially inner surface 322 of pylon 20. The strut 220 may comprise an outer strut shell 332 and an inner strut shell 334. The outer strut shell 332 may be exposed to airflow from core airflow path C in FIG. 1B during operation of the gas turbine engine 110. The conductive cable cooling system 300 may further comprise an air seal 340 disposed between inner strut shell 334 and outer strut shell 332. In this regard, the air seal 340 may ensure that the plurality of conductive cables 310 are sealed from air from core airflow path C.

In various embodiments, the conductive cable cooling system 300 further comprises a conduit 350. The conduit 350 may be configured to house the plurality of conductive cables 310 through strut 220. The conduit 350 may be flexible or rigid. The conduit 350 may comprise a woven fiberglass sleeve, or the like. The conduit 350 may protect the plurality of conductive cables 310 from contacting strut 220 during operation of the gas turbine engine 110 from FIG. 1. The conduit 350 may further provide a cooling passageway for cooling air to flow from the external air source 232.

In various embodiments, the conductive cable cooling system 300 further comprises an electric fan 360 in fluid communication with the conduit 350 and a vent 370. The electric fan 360 may be configured to actively cool the plurality of conductive cables 310. The vent 370 may be configured to open or close. The electric fan 360 may be configured to receive cooling airflow from ambient air (e.g., an external air source from the nacelle, such as external air source 232). The electric fan 360 and the vent 370 may be electrically coupled to a processor 390. In various embodiments, processor 390 may be in electrical communication with electric fan 360. The processor 390 may be configured to activate, increase, or decrease a speed of the electric fan in response to various operation conditions of the gas turbine engine. Similarly, the vent 370 may be modulated in response to changes in various operation conditions of gas turbine engine. The processor 390 may be configured to detect an engine shutdown. In response to the engine shutdown, processor 390 may command vent 370 to open and command the electric fan to activate and begin rotating. In various embodiments, vent 370 may already be open at engine shutdown, and the processor may command the electric fan to increase a rotation speed or begin to rotate. In various embodiments, vent 370 may be commanded to operate between open and closed during operation in response to a desired airflow desired in conduit 350.

The vent 370 may assume a closed configuration, an open configuration (100% open), and/or a partially open configuration (ranging anywhere between 0% open and 100% open) as commanded by a controller. In various embodiments, the closed configuration may comprise the vent 370 being a minimum percent open, which may be set at any desired minimum percent open. For the sake of simplicity, in this disclosure, the minimum percent open for the closed configuration is 0% open. In various embodiments, the vent actuator may cause the vent 370 to become more open or less open, at any time before, during, or after operation of the gas turbine engine 110 from FIG. 1B to assume the open configuration, a partially open configuration, and/or the closed configuration.

In various embodiments, processor 390 may be integrated into computer systems onboard an aircraft, such as, for example, a full authority digital engine control (FADEC), an engine-indicating and crew-alerting system (EICAS), and/or the like. Processor 390 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, processor 390 may comprise a processor configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se.

In various embodiments, processor 390 may be configured to control conductive cable cooling system 300. For example, processor 390 may be configured to transfer a control signal to electric fan to actively control cooling of the plurality of conductive cables 310. Processor 390 may generate and transmit the control signal based on an input received from FADEC or an electronic engine control in response to gas turbine engine shutting down. In this regard, conductive cable cooling system 300 may allow for active cooling of the plurality of conductive cables 310 after engine shutdown. The excitation control signal may further comprise electronic instructions configured to cause the electric fan 360 to rotate and provide cooling air in response to a temperature in conduit 350 exceeding a predetermined threshold. For example, a temperature sensor may be disposed in conduit 350 in electrical communication with the processor 390. In response to the temperature sensor detecting a conduit temperature above a threshold level, electric fan 360 may be active. In various embodiments, processor 390 may be configured to transmit a control signal to rotate electric fan 360 during operation of gas turbine engine 110 from FIG. 110. In this regard, electric fan 360 may drive air from external air source 232 (e.g., ambient air). The external air source 232 may provide colder air relative to bypass airflow, core airflow or the like and/or provide better cooling to the plurality of conductive cables than typic cable cooling systems.

In various embodiments, the cooling air provided by electric fan 360 may travel along cooling path D through the pylon 22 and strut 220 into the tail cone 122 and exit out an egress disposed at an aft end of tail cone 122.

Figure 3:
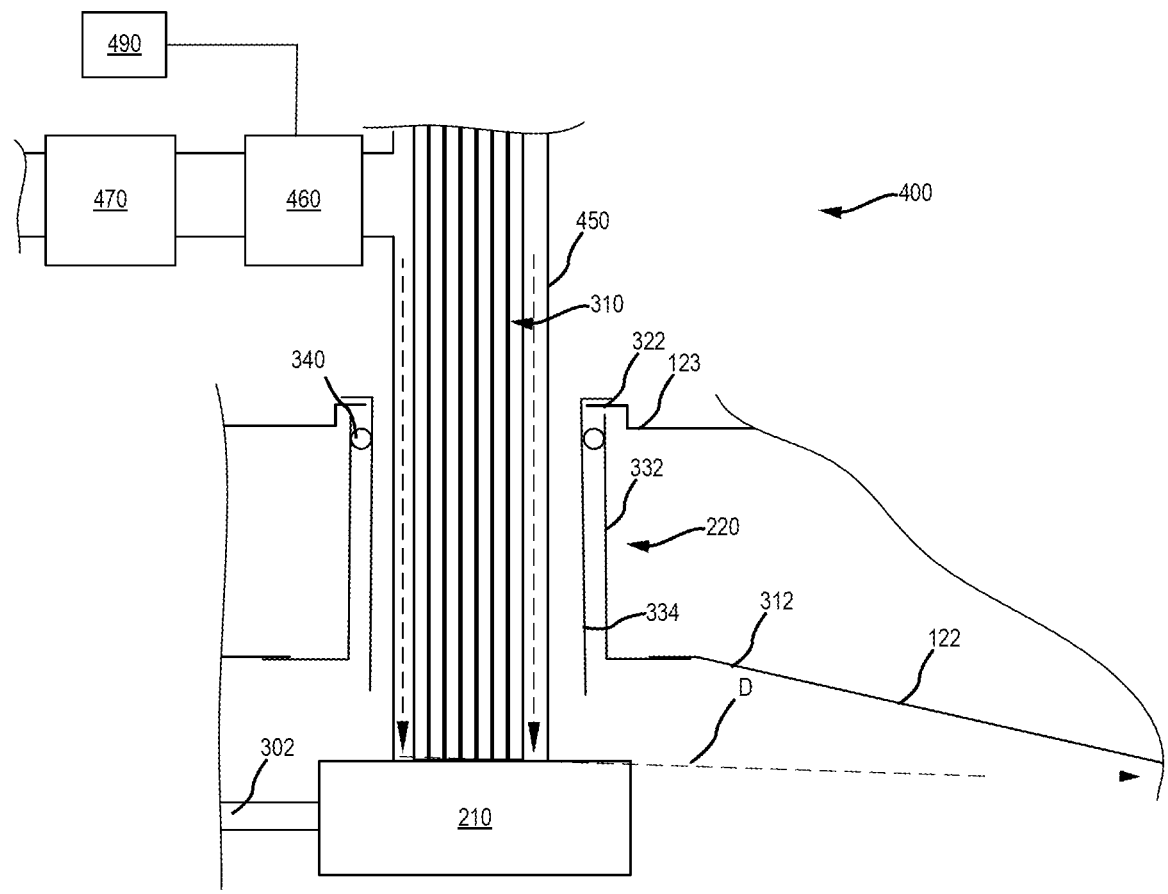
FIG. 3 illustrates a schematic view of cooling system of a gas turbine engine, in accordance with various embodiments.

Referring now to FIG. 3, a schematic view of a conductive cable cooling system 400, in accordance with various embodiments, is illustrated. The conductive cable cooling system 400 comprises a plurality of conductive cables 310. The conductive cables 310 are extending from an electric motor 210 disposed in a tail cone 122. The electric motor 210 is operably coupled to a low speed spool 302 of a gas turbine engine (e.g., gas turbine engine 110 from FIG. 1B). The conductive cable cooling system 400 further comprises a strut 220 extending from a radially outer surface 312 of tail cone 122 to a radially inner surface 322 of pylon 20. The conductive cable cooling system 400 may further comprise an air seal 340 disposed between inner strut shell 334 and outer strut shell 332. In this regard, the air seal 340 may ensure that the plurality of conductive cables 310 are sealed from air from core airflow path C.

In various embodiments, the conductive cable cooling system 300 further comprises a conduit 450. The conduit 450 may be configured to house the plurality of conductive cables 310 through strut 220. The conduit 450 may be an oversized tube, or the like. The conduit 450 may be made of a nickel alloy, a stainless steel alloy, or any other material known in the art. The conduit 450 may protect the plurality of conductive cables 310 from contacting strut 220 during operation of the gas turbine engine 110 from FIG. 1. The conduit 450 may be configured to receive a lubricant, such as engine oil or the like. The lubricant may be from an oil tank in the gas turbine engine or a secondary oil tank/oil circuit.

In various embodiments, the conductive cable cooling system 400 further comprises an oil pump 460 and a heat exchanger 470 in fluid communication with the conduit 450. The oil pump 460 may be configured to pump oil from an oil tank through heat exchanger 470 and into the conduit 450 to cool the plurality of conductive cables 310. The conductive cable cooling system 400 may be configured to return the oil to the respective oil tank. As such, conductive cable cooling system 400 may be a closed cooling system.

In various embodiments, the oil pump 460 may be an electric oil pump. For example, the oil pump 460 may be electrically coupled to a processor 490. In various embodiments, processor 490 may be in electronic communication with oil pump 460. In various embodiments, processor 490 may be integrated into computer systems onboard an aircraft, such as, for example, a full authority digital engine control (FADEC), an engine-indicating and crew-alerting system (EICAS), and/or the like. Processor 490 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, processor 490 may be configured to control conductive cable cooling system 400. For example, processor 490 may be configured to transfer a control signal to oil pump 460 to actively control cooling of the plurality of conductive cables 310. Processor 490 may generate and transmit the control signal based on an input received from FADEC or EEC in response to gas turbine engine shutting down. In this regard, conductive cable cooling system 400 may allow for active cooling of the plurality of conductive cables 410 after engine shutdown. The excitation control signal may further comprise electronic instructions configured to cause the oil pump 460 to pump oil and provide a cooling fluid in response to a temperature in conduit 350 exceeding a predetermined threshold. For example, a temperature sensor may be disposed in conduit 350 in electrical communication with the processor 490. In response to the temperature sensor detecting a conduit temperature above a threshold level, oil pump 460 may be active. In various embodiments, processor 490 may be configured to transmit a control signal to activate the oil pump 460 during operation of gas turbine engine 110 from FIG. 110. In this regard, oil pump 460 may drive oil through heat exchanger 470 and into the conduit 450.

Figure 4:
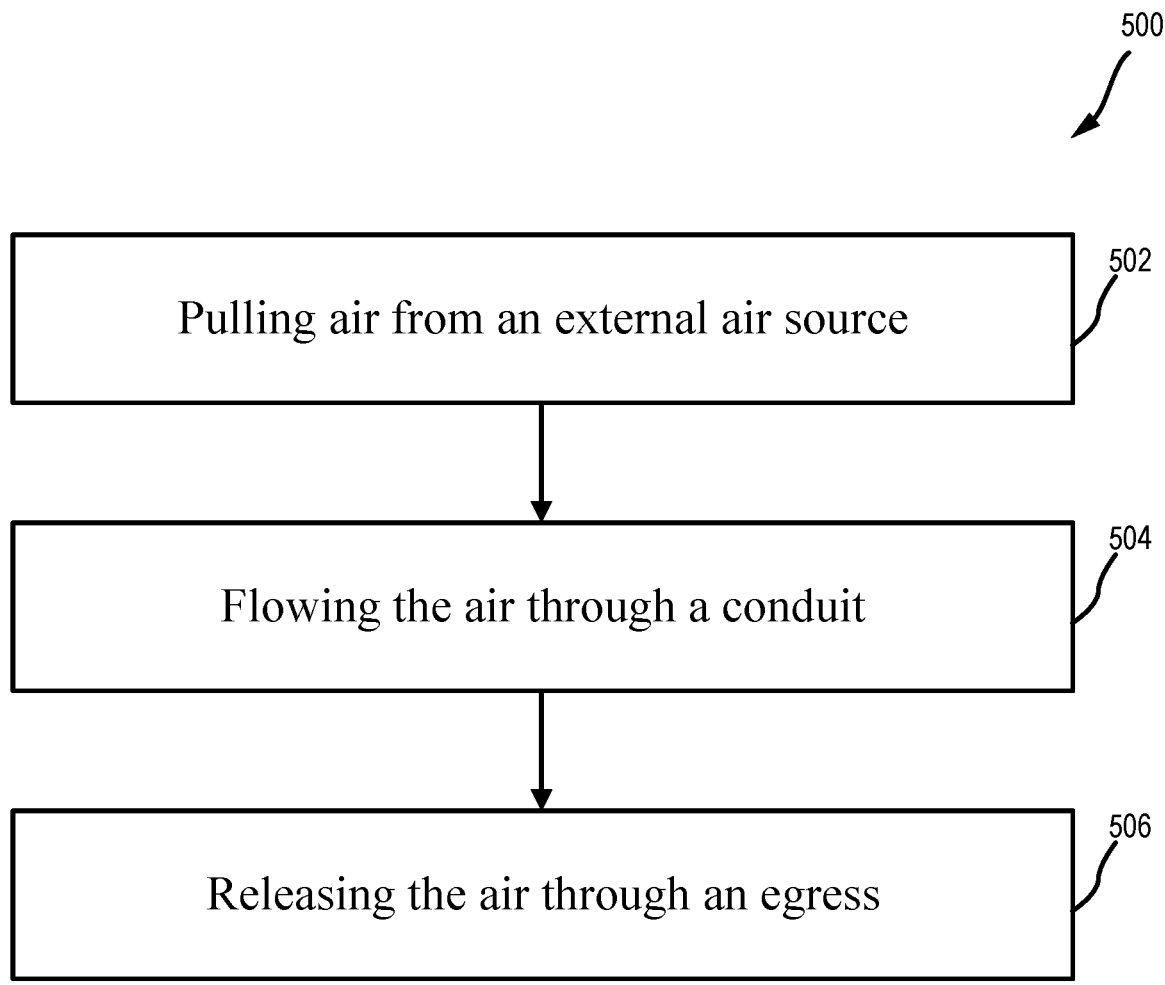
FIG. 4 illustrates a method of using a cooling system of a gas turbine engine, in accordance with various embodiments.

Referring now to FIG. 4, a method 500 of using a conductive cable cooling system 300 (from FIG. 2) of a gas turbine engine 110 (from FIG. 1A), in accordance with various embodiments, is illustrated. The method 500 comprises pulling air from an external source (step 502). The external air source may be exposed to ambient air during operation of the gas turbine engine. The external air source may be disposed radially outward from a bypass flow path of the gas turbine engine. The external air source may be exposed to air colder relatively to airflow in the bypass flow path during operation of the gas turbine engine. The external air source may include a vent, a scoop, or the like. In various embodiments, the pulling the air may further comprise pulling the air via an electric fan. The electric fan may be disposed in a conduit in a pylon of an aircraft.

The method 500 may further comprise flowing the air through the conduit (step 504). The conduit may extend from the pylon of an aircraft through an inner fixed structure and into a tail cone. The tail conduit may be disposed in a strut extending between the tail cone and the inner fixed structure. The conduit may house a plurality of conductive cables. Flowing the air through the conduit may further comprise cooling the plurality of conductive cables disposed in the conduit. The plurality of cables may be coupled to an electric machine disposed in the tail cone.

The method 500 may further comprise releasing the air through an egress (step 506). The egress may be disposed at an aft end of the tail cone. The egress may allow the air to be released to the atmosphere. In various embodiments, method 500 may allow active cooling of a plurality of conductive cables in electric communication with an electric machine disposed in a tail cone of a gas turbine engine. In this regard, the plurality of cables may be actively cooled after gas turbine engine is no longer operating by activating the fan. This may provide more efficient cooling after engine shutdown. In various embodiments, the method 500 may allow active cooling during operation of a gas turbine engine with colder air relative to airflow through a bypass flow path and/or airflow through a core flow path.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine with a cooling system, the gas turbine engine comprising:
   an electric motor;
   a conduit;
   a plurality of conductive cables extending from the electric motor;
   an external air source in fluid communication with the conduit, the cooling system configured to flow air from the external air source through the conduit to cool the plurality of conductive cables after shutdown of the gas turbine engine;
   a pylon and a strut, wherein the strut extends from a tail cone to the pylon, wherein the electric motor is disposed in the tail cone, and wherein the conduit extends through the strut and the pylon to the external air source, wherein the plurality of conductive cables extend from the electric motor through a portion of the conduit and into the pylon aft of a turbine of the gas turbine engine.

2. The gas turbine engine of claim 1, wherein the cooling system comprises an electric fan.

3. The gas turbine engine of claim 2, wherein the electric fan is configured to actively cool the plurality of conductive cables.

4. The gas turbine engine of claim 2, wherein the external air source is in fluid communication with the electric fan.

5. The gas turbine engine of claim 4, wherein the external air source is disposed radially outward from a bypass airflow path of the gas turbine engine.

6. The gas turbine engine of claim 1, further comprising:
   a processor; and
   a non-transitory computer readable storage medium in electronic communication with the processor, the non-transitory computer readable storage medium having instructions stored thereon that, in response to execution by the processor cause the processor to perform operations comprising:
   detecting, by the processor, a shutdown of the gas turbine engine;
   activating, by the processor, the cooling system; and
   in response to the activating the cooling system, pulling the air from the external air source through the conduit having the plurality of conductive cables disposed therein.

7. The gas turbine engine of claim 6, wherein the cooling system includes an electric fan, and wherein activating further comprises increasing a speed of the electric fan.

8. The gas turbine engine of claim 6, wherein the cooling system includes an electric fan, and wherein the operations further comprise opening, by the processor, a vent in fluid communication with the external air source.

9. The gas turbine engine of claim 6, wherein the cooling system includes an electric fan, wherein the plurality of conductive cables are disposed at least partially in the conduit, and wherein the conduit is in fluid communication with the electric fan.

\* \* \* \* \*